United States Patent [19]
DeBoodt et al.

[11] Patent Number: 4,575,391
[45] Date of Patent: Mar. 11, 1986

[54] PROCESS AND COMPOSITIONS FOR CONDITIONING SOILS

[75] Inventors: Marcel F. DeBoodt, Ghent; Werner G. Minjauw, Gullegem; Hermann Oppliger, Herstal, all of Belgium

[73] Assignee: Societe Carbochimique Societe Anonyme, Belgium

[21] Appl. No.: 573,177

[22] Filed: Jan. 23, 1984

[30] Foreign Application Priority Data

Jan. 24, 1983 [LU] Luxembourg .......................... 84601

[51] Int. Cl.$^4$ .......................... C05C 9/00; C09K 17/00
[52] U.S. Cl. .......................................... 71/28; 71/903; 405/264
[58] Field of Search .......................... 71/1, 11, 27–30, 71/903, 17–20; 405/263, 264

[56] References Cited

U.S. PATENT DOCUMENTS 4,251,255  2/1981  Wagner et al. .................. 71/903 X
4,299,613  11/1981 Cardarelli .......................... 71/27 X
4,303,438  12/1981 Zaslavsky et al. ................ 71/903 X

OTHER PUBLICATIONS

CA 98(24): 199481j, Balo et al., "Improvement of Water Holding Capacity of Loose Soils", 8-30-82, (English Abstract).

Primary Examiner—Ferris H. Lander
Attorney, Agent, or Firm—Sughrue, Mion, Zinn, Macpeak & Seas

[57] ABSTRACT

This invention relates to a process and compositions for conditioning soils. More particularly, it relates to an improvement in the soil conditioning properties of known polymers.

In the process according to the invention for conditioning soils, the soil is treated with an iron salt and at least one polymer which does not require a pH greater than about 7 for it to harden, in the presence of a protein substance.

The iron salt is preferably selected from ferrous sulphate, ferric sulphate, ferric chloride and mixtures thereof.

The polymer is at least one polymer selected from the resins of the aminoplast type, polyurethanes, polyvinyl alcohol which may be urethanized, potassium polystyrene sulphonate, maleic acid-vinyl acetate copolymers, polyvinyl acetate, polybutadiene, synthetic rubbers, natural rubber latex and asphaltic bitumen. The preferred polymer is a urea-formaldehyde resin which may be mixed with urea in a free condition or a polyurethane.

The protein substance which may be of animal or vegetable origin is selected from protein fractions of animal blood, milk and tissues or from protein fractions of cereals or leguminous plants, the preferred protein substances being haemoglobin hydrolysate, whey, buttermilk or a protein derived from soya.

The iron salt, the polymer or polymers and the protein substance are preferably used in the form of aqueous solutions or dispersions which are sprayed over the surface of the soil or are incorporated into the topsoil.

The composition according to the invention for conditioning soils contains (A) an iron salt preferably selected among the abovenamed iron salts, (B) at least one polymer which does not require a pH greater than about 7 for it to harden, preferably a resin or polymer selected among the above polymers and (C) a protein substance, preferably a protein substance of animal or vegetable origin selected among the protein substances.

25 Claims, No Drawings

PROCESS AND COMPOSITIONS FOR CONDITIONING SOILS

THE PRIOR ART

Various types of polymers are used, generally in the form of aqueous solutions or suspensions, for conditioning soils in the spheres of civil engineering and agriculture. In civil engineering, soil conditioners are used as soil stabilizers in order to harden the land, for example for foundations, for the construction of roads, or for other building operations. In agriculture, soil conditioners are used to stabilize and improve the structure of the soil in order to increase the crop yields or to make fit for cultivation land which is unsuitable for crop-growing, such as arid soil, sand, or land whose structure has been damaged.

The use of urea-formaldehyde resins as soil conditioners in agriculture is described in, for example, French Pat. No. 1,241,898. When applied onto the soil by spraying or when incorporated into the soil, the urea-formaldehyde resin hardens and as it does so, it binds the particles of earth together, forming a structure of stable aggregates. In this manner, the phenomenon of particles of earth being eroded or carried away by wind or water is reduced. An improved porosity of the soil also facilitates the penetration by water and air into the soil, while reducing water losses due to evaporation. Moreover, urea-formaldehyde resins advantageously decompose in the course of time, while progressively releasing urea which is a fertilizer for plants.

Urea-formaldehyde resins which may be used as soil conditioners are the same type of resins as those which are used in other areas as adhesives. These are resins which are not completely polymerised, the polymerisation of which is completed at the point of application under the effect of an acid hardening catalyst. Such resins are obtained from urea and formaldehyde using a molar ratio of formaldehyde:urea which is generally greater than 1, usually from about 1.5 to 2. In solution, these resins contain a small amount of formaldehyde in a free condition. Moreover, as the resin hardens, the free formaldehyde disappears to a certain extent due to polycondensation reactions.

It is also known that urea may be incorporated into aqueous compositions of urea-formaldehyde resins which are used as soil conditioners, mainly in order to reduce the odour or other drawbacks which are due to formaldehyde in a free condition. The release of formaldehyde in a free condition, which is considerable at the time of application to the soil and which continues, while decreasing, for several days after application, is a serious disadvantage, in particular when urea-formaldehyde resins are used as soil conditioners in agriculture on account of the phytotoxic nature of formaldehyde. Thus, if the soil conditioner based on urea-formaldehyde resin is applied when seeds are being sown or just afterwards, the formaldehyde which is released often greatly inhibits and reduces the germination of the seeds. The incorporation of urea into urea-formaldehyde soil conditioners which are used in agriculture reduces the phytotoxicity of the free formaldehyde. Moreover, the presence of urea in the soil conditioner is advantageous because urea is a fertilizer for plants. However, if urea is present in the aqueous composition of urea-formaldehyde in a certain concentration above about 5% by weight, it may disadvantageously reduce the stabilization effect on the soil of the urea-formaldehyde conditioner.

Polyurethane prepolymers having free isocyanate groups which are obtained by reacting a polyol with an excess of a polyisocyanate are used as other known soil conditioning polymers. By the reaction of the free isocyanate groups with water, these prepolymers are converted into polyurethane-polyureas. The conditioning of soils using polyurethanes is described in, for example, British Pat. No. 1,322,490, German Pat. No. 2,202,205 and Belgian Pat. No. 871,177.

According to one known process, the polyurethane prepolymer is used dissolved in an organic solvent, such as acetone, and the soil is directly treated with the prepolymer having free isocyanate groups in order to form in situ in the soil, by a reaction with water, a polyurethane-polyurea polymer which binds the particles of earth together.

Another known process for conditioning soils using polyurethane comprises diluting the polyurethane prepolymer, just before it is used, in water, possibly in the presence of a surfactant, to form an aqueous solution or dispersion of a polyurethane-polyurea polymer which is sprayed over the soil.

BRIEF DESCRIPTION OF THE INVENTION

It has now been found that the soil conditioning properties of compositions based on polymers may be greatly improved in an unexpected way using an iron salt and proteins, either by incorporating these products into the composition of the polymer applied to the soil, or by using them to treat the soil separately from the application of the polymer composition.

The properties of ferrous sulphate as a soil conditioner for certain types of soil, such as saline or alkaline soils are known. These properties are described in, for example, the Journal entitled "THE SOUTH AFRICAN INDUSTRIAL CHEMIST", October 1964, pages 134 to 136.

However, it was surprising to find that there is a synergic improvement effect of the soil conditioning properties of compositions based on particular polymers, this synergic effect resulting from the use, combined with the application of these polymers, of an iron salt simultaneously with proteins.

This invention relates to a process for conditioning soils, in which the soil is treated with an iron salt and a polymer in order to bind the particles of soil and, in this manner, to form stable aggregates of these particles, the process being essentially characterised in that the soil is treated with an iron salt and with at least one polymer which does not require a pH greater than about 7 for it to harden, in the presence of a protein substance.

In the present process, it is possible to use the following as the iron salt:ferrous sulphate, ferric sulphate, ferric chloride or mixtures of at least two of these salts. Ferrous sulphate ($FeSO_4.7H_2O$) is preferred.

As polymers which do not require a pH of greater than 7 for them to harden, it is possible to use, according to the present invention, a polymer which is selected from the resins of the aminoplast type, polyurethanes, polyvinyl alcohol which may be urethanised, potassium polystyrene sulphonate, maleic acid-vinyl-acetate copolymers, polyvinyl acetate, polybutadiene, synthetic rubbers, natural rubber latex and asphaltic bitumen. It is preferred to use a urea-formaldehyde resin which is preferably mixed with urea in a free condition, and/or a polyurethane.

According to another characteristic of the present invention, a protein substance of animal or vegetable origin is used, in particular a protein substance which is selected from protein fractions of animal blood, milk and tissues, or selected from protein fractions of cereals or leguminous plants.

Preferred protein substances include haemoglobin originating, for example from the blood of cattle, whey, buttermilk, casein, soya proteins, gluten, collagen or gelatine.

According to a characteristic of the present invention, ferrous sulphate and a protein substance are preferably used in proportions which are expressed with respect to the dry matter weight of the polymer of from about 10 to 80% by weight of ferrous suphate and from about 1 to 20% by weight of protein substance.

The soil conditioning treatment may be carried out according to known techniques. Thus, the soil conditioner may be applied to the soil, preferably by spraying, so that the soil is covered. The conditioner may also be mixed with the topsoil after spraying, or it may be incorporated into the soil.

More particularly, the process according to the present invention may be used for conditioning soils using compositions which contain a urea-formaldehyde resin containing free urea, and/or compositions based on polyurethanes.

These compositions are generally in the form of aqueous solutions or supensions which may contain, in addition to the polymer or polymers, various conventional additives, such as emulsifier, catalyst, dye or pH regulating agent.

The concentrations of polymers in these aqueous compositions, as well as the quantities to be applied to condition the soil are variable. In particular, they depend on the type of polymer, on the nature of the soil to be treated and on the method of application.

The compositions which are based on urea-formaldehyde resins and which may be used within the scope of the present invention are aqueous solutions or suspensions containing a urea-formaldehyde resin and urea in a free condition. They are obtained from resins resulting from the condensation of urea and formaldehyde in a molar ratio of urea:formaldehyde of from about 1:1 to 1:2.5. These resins are available in commerce either in the form of solutions having a dry matter content of about 60%, or in the form of a powder which is obtained by drying the solution by pulverisation.

In the present process to condition soils, it is possible to use aqueous compositions, the content of urea-formaldehyde resin of which, expressed in dry matter weight of resin with respect to the total weight of the composition, is from about 2 to 70%, usually from about 3 to 40%. In addition to the urea-formaldehyde resin, these aqueous compositions contain, within the scope of the present invention, a certain quantity of free urea, having a concentration of from about 0.1 to 15% by weight, preferably from about 0.5 to 4% by weight, with respect to the total weight of the composition.

To condition soils by the process according to the present invention, the aqueous compositions based on urea-formaldehyde resin and urea are used combined with ferrous sulphate and a protein substance. The iron salt and the protein substance may be incorporated into the aqueous urea-formaldehyde composition when it is applied to the soil, or they may be used for treating the soil separately from the composition based on urea-formaldehyde.

Since ferrous sulphate exerts a catalysing effect on the hardening of the urea-formaldehyde resin due to its acid nature, the addition of ferrous sulphate to the composition based on urea-formaldehyde may cause the resin to harden within a few hours. In order to avoid disadvantages due to the possible formation of deposits during application, the ferrous sulphate is preferably not incorporated into the aqueous composition based on urea-formaldehyde, but is applied to the soil shortly before the urea-formaldehyde based composition is applied. According to one preferred embodiment of the present method, the soil is initially treated with a ferrous sulphate which is used in the form of an aqueous solution, followed by the application of the aqueous composition containing the urea-formaldehyde resin and urea, into which a protein substance has been incorporated.

The quantities of urea-formaldehyde resin as well as the concentrations of the compositions to be used for conditioning the soil vary depending on the type of soil and on the method of treating the soil. If the products are applied by spraying in order to cover the soil, aqueous compositions are used which preferably contain from about 20 to 40% by weight of urea-formaldehyde resin and from about 1 to 4% by weight of free urea, by applying metered quantities, expressed in dry matter weight of urea-formaldehyde resin, of from about 25 to 200 g/m$^2$. On sandy soils, metered quantities of from about 70 to 100 g/m$^2$ by weight of dry matter of urea-formaldehyde resin generally give very good results. If the products are incorporated into the soil by being mixed with the surface layer of the soil, more dilute aqueous compositions are generally used which preferably contain from about 3 to 8% by weight of urea-formaldehyde resin and from about 0.1 to 0.5% by weight of urea, by applying metered quantities, expressed in dry matter weight of urea-formaldehyde resin, with respect to the weight of the soil, of from about 0.2 to 2%, usually about 1%.

The use of the aqueous compositions based on urea-formaldehyde resin as soil conditioners by the process according to the present invention gives particularly favourable results in the treatment of sandy types of soil or clay soils containing up to about 10% of clay, and is most suitable for improving arid land to render it fit for cultivation.

A synergic improvement effect is observed in the soil conditioning properties of the urea-formaldehyde resin, which simultaneously results from the presence of urea in the aqueous urea-formaldehyde composition and from the combined use of ferrous sulphate and protein substance. If the soil is conditioned for agricultural purposes, the urea which is present in these compositions also provides the advantages of reducing the phytotoxicity due to the formaldehyde, and constituting a fertilizer for the plants.

The ferrous sulphate exerts a soil conditioning effect in particular on account of its hydrolysis which gives rise to the formation of ferrous hydroxide and sulphuric acid. Sulphuric acid reduces the pH of the soil and also favours the hardening of the urea-formaldehyde resin, whereas ferrous hydroxide is rapidly oxidized in the soil when it comes into contact with air, to produce ferric hydroxides which polymerise on the particles of soil.

The protein substance improves the water-retention capacity of the soil, in addition to its effect of increasing the stability of the soil. It increases the adsorption surface of the soil, thus reducing the losses of water caused by evaporation.

In the process for conditioning soils which is an object of the present invention, it is also possible to use other polymers apart from urea-formaldehyde resins which contain urea. Thus, polyurethanes in particular may be used.

Polyurethanes or other polymers which do not require a pH greater than 7 for their hardening are also preferably used in the form of aqueous compositions. Ferrous sulphate and the protein substance may be incorporated into these aqueous compositions. In this case, as in the case of soil conditioners based on urea-formaldehyde resin, it is also possible to initially treat the soil with the ferrous sulphate in aqueous solution and then to apply the aqueous composition of the polymer, into which the protein substance has been incorporated.

In general, the quantities of polyurethanes to be applied to condition the soil are not as high as when urea-formaldehyde resins are used.

Thus, when the soil conditioner is applied to the soil by spraying in order to cover the soil, very good results are generally obtained by using metered quantities, expressed in dry matter weight of the polymer, of from about 30 to 50 g/m$^2$ of polyurethane.

The process for conditioning soils according to the present invention makes it possible to greatly improve the soil conditioning effect of polymers. This conditioning effect essentially consists of the formation of stable aggregates by the particles of earth binding together. This produces an improved structure and a greater stability of the soil. The resistance of the soil to the effects of wind and rain or to erosion is thus improved. At the same time, the soil acquires a greater permeability, while the loss of water caused by evaporation is reduced.

This invention also relates to compositions which allow the above-mentioned process for conditioning soils to be carried out.

The compositions according to the present invention are essentially characterised in that they contain an iron salt, at least one polymer which does not require a pH greater than 7 for it to harden, and a protein substance, the iron salt preferably being ferrous sulphate, and the polymer preferably being a urea-formaldehyde resin which is advantageously mixed with urea in a free condition, or a polyurethane.

The protein substance may consist, inter alia, of whey, red blood cells of cattle, a haemoglobin hydrolysate or a protein extract of soya beans.

In a particular embodiment of the composition according to this invention, this composition contains from about 10 to 80% by weight of ferrous sulphate and from about 1 to 20% by weight of protein substance with respect to the dry matter weight of the polymer or polymers.

The composition according to this invention advantageously takes the form of aqueous solutions or dispersions of the three constituents, i.e., the iron salt, the polymer or polymers and the protein substance.

EXAMPLES

This invention will now be illustrated by the following non-limiting examples.

In these examples, the stabilization effect on the soils of different polymer-based compositions is determined by measuring the stability of the aggregates by the method devised by DE BOODT and DE LEENHEER, described in the publication entitled "WEST EUROPEAN METHODS FOR SOIL STRUCTURE DETERMINATION", pages VI 28 to VI 31. According to this method, the aggregates are subjected to two sifting operations in order to determine the aggregation percent and the index of stability Is.

By calculating the product of these two values, the stability quotient Qs is obtained which is a measurement of the stability of the aggregates.

In a first series of Examples 1 to 16, aqueous compositions based on a urea-formaldehyde resin containing about 33% by weight of dry matter of urea-formaldehyde (UF) resin and aqueous compositions based on polyurethane (URESOL, marketed by the company PRB, Belgium), containing about 5% by weight of polyurethane were used. By way of comparison, this series of Examples was also carried out using aqueous compositions containing a polymer, in the present case a polyacrylamide which does not fall within the scope of the present invention, i.e., a polymer requiring a pH greater than 7 for it to harden, these latter aqueous compositions containing about 4% by weight of polyacrylamide (PAM).

In this first series of examples, the tests were carried out on Egyption sand by spraying the aqueous composition of the polymer over the soil. The treatment using ferrous sulphate was carried out separately before the polymer composition was applied, by spraying an aqueous solution containing about 11% by weight of ferrous sulphate over the soil. The protein substance (red blood cells from cattle) was incorporated into the aqueous polymer compositions.

Tables I, II and III give the results of the first series of examples.

TABLE I

TESTS CARRIED OUT ON EGYPTIAN SAND USING COMPOSITIONS BASED ON UREA-FORMALDHYDE RESIN

| EXAMPLES | FORMULATIONS AND QUANTITIES APPLIED | AGGREGATION % >2 mm | STABILITY INDEX Is | STABILITY QUOTIENT Qs |
|---|---|---|---|---|
| 1 | UF 75 g/m$^2$ | 40.18 | 0.53 | 21.29 |
| 2 | UF 75 g/m$^2$ + urea 3.75 g/m$^2$ | 54.75 | 0.47 | 25.73 |
| 3 | UF 75 g/m$^2$ + cells 3.75 g/m$^2$ | 56.9 | 3.7 | 210.53 |
| 4 | UF 75 g/m$^2$ + FeSO$_2$ 7H$_2$O 25 g/m$^2$ | 63.48 | 5.88 | 373.26 |
| 5 | UF 75 g/m$^2$ + cells 3.75 g/m$^2$ + FeSO$_4$ 7H$_2$O 25 g/m$^2$ | 56.62 | 5.55 | 314.24 |
| 6 | UF 75 g/m$^2$ + urea 3.75 g/m$^2$ + cells 3.75 g/m$^2$ | 67.11 | 3.22 | 216.09 |
| 7 | UF 75 g/m$^2$ + urea 3.75 g/m$^2$ + FeSO$_4$ 7H$_2$O 25 g/m$^2$ | 65.57 | 2.00 | 131.14 |
| 8 | UF 75 g/m$^2$ + urea 3.75 g/m$^2$ + cells 3.75 g/m$^2$ + FeSO$_4$ 7H$_2$O 25 g/m$^2$ | 65.73 | 7.90 | 519.27 |

TABLE II

TETS CARRIED OUT ON EGYPTIAN SAND USING COMPOSITIONS BASED ON POLYURETHANE

| EXAMPLES | FORMULATIONS AND QUANTITIES APPLIED | AGGREGATION % >2 mm | STABILITY INDEX Is | STABILITY QUOTIENT Qs |
|---|---|---|---|---|
| 9 | URESOL 40 g/m² | 71.74 | 1.82 | 130.57 |
| 10 | URESOL 40 g/m² + cells 2 g/m² | 69.42 | 5.55 | 385.28 |
| 11 | URESOL 40 g/m² + FeSO₄ 7H₂O 25 g/m² | 61.45 | 3.70 | 227.36 |
| 12 | URESOL 40 g/m² + cells 2 g/m² + FeSO₄ 7H₂O 25 g/m² | 70.05 | 7.69 | 538.68 |

TABLE III

TESTS CARRIED OUT ON EGYPTIAN SAND USING COMPOSITIONS BASED ON POLYACRYLAMIDE

| EXAMPLES | FORMULATIONS AND QUANTITIES APPLIED | AGGREGATION % >2 mm | STABILITY INDEX Is | STABILITY QUOTIENT Qs |
|---|---|---|---|---|
| 13 | PAM 20 g/m² | 54.11 | 0.35 | 18.94 |
| 14 | PAM 20 g/m² + cells 1 g/m² | 47.50 | 2.56 | 121.60 |
| 15 | PAM 20 g/m² + FeSO₄ 7H₂O 25 g/m² | 55.23 | 0.36 | 19.88 |
| 16 | PAM 20 g/m² + cells 1 g/m² + FeSO₄ 7H₂O 25 g/m² | 47.53 | 2.56 | 121.68 |

Table I gives the results which are obtained using aqueous compositions based on urea-formaldehyde (UF) resins on Egyption sand.

Tables II and III give the results of tests carried out on Egyptian sand using aqueous compositions based on polyurethane (URESOL) and on polyacrylamide (PAM), these latter compositions being used for comparison.

A study of Tables I, II and III clearly shows that the use of the compositions according to the present invention, i.e., on the one hand, UF resin+urea+protein substance (cells)+FeSO₄ (Example 8) and, on the other hand URESOL polymer+protein substance (cells)-+FeSO₄ (Example 12) gives remarkable stability quotients Qs which show a synergic effect compared with the stability quotients obtained when the UF resin or the URESOL polyurethane are used on their own or together with one of the other constituents, i.e., either the protein substance, or the ferrous sulphate.

Table III shows that the use of polyacrylamide surprisingly does not make it possible to obtain such a synergic effect (see, in particular Example 16, compared with Examples 13, 14 and 15).

In Examples 17 to 23, compositions according to the present invention were used in the following quantities on Egyptian sand:
UF resin: 75 g/m²;
free urea: 3.75 g/m²;
ferrous sulphate (FeSO₄.7H₂O): 25 g/m²;
protein substance: 3.75 g/m².

The following Table IV indicates the noteworthy results which are obtained using different protein substances.

TABLE IV

TESTS CARRIED OUT ON EGYPTIAN SAND USING COMPOSITIONS CONTAINING DIFFERENT PROTEIN SUBSTANCES

| EXAMPLES | PROTEIN SUBSTANCE | PROTEIN CONTENT % | AGGREGATION % >2 mm | STABILITY INDEX Is | STABILITY QUOTIENT Qs |
|---|---|---|---|---|---|
| 17 | Powdered whey | 12-14 | 9.67 | 2.23 | 184.83 |
| 18 | Ultracentrifuged whey | 30 | 74.07 | 4.54 | 336.28 |
| 19 | Ultracentrifuged whey | 75 | 78.59 | 8.33 | 654.65 |
| 20 | Soya extract (low viscosity) | 90 | 67.96 | 3.22 | 218.83 |
| 21 | Soya extract (high viscosity) | 90 | 65.92 | 3.22 | 212.26 |
| 22 | Powdered buttermilk | 30-35 | 79.65 | 3.57 | 284.03 |
| 23 | Na caseinate | 90 | 59.91 | 5.88 | 352.27 |

Experiments of growing fodder beet and carrots in sandy soils show that the germination and harvest yields are favourably influenced when the soils are conditioned by the process according to the present invention, as demonstrated by the following Table V.

TABLE V

| Stabilisation quotient of the soil | A — Qs = 25.38 | B — Qs = 48.47 | C — Qs = 104.35 |
|---|---|---|---|
| Germination | | | |
| fodder beet | 100 | 119.40 | 136.30 |
| carrots | 100 | 111.31 | 136.26 |
| Harvest | | | |
| fodder beet | 100 | 112.84 | 120.56 |
| carrots | 100 | 90.68 | 119.35 |

Legend:
A: Unconditioned soil (control).
B: Soil treated with UF:75 g/m² + Emulsan (haemoglobin hydrolysate manufactured by PROBIO, Peruwelz, Belgium): 3.75 g/m² + urea: 13.5 g/m².
C: Soil treated with UF: 75 g/m² + Emulsan: 3.75 g/m² + urea:13.5 g/m² + FeSO₄.7H₂O: 25 g/m².

Table V not only shows a spectacular increase in the stability quotient Qs, but also an improvement with respect to germination and harvesting, which demonstrates the absense of phytotoxicity of the soil conditioning treatment by the process according to the present invention.

We claim:

1. A process for conditioning loose or sandy soils, comprising treating the soil with an iron salt and with an aqueous solution or dispersion containing at least one polymer which does not require a pH greater than about 7 for it to harden and a protein substance, said protein substance being of animal or vegetable origin, said protein of animal origin being selected from the group consisting of protein fractions of animal blood, milk and tissues, said vegetable protein being selected from the group consisting of protein fractions of cereals or leguminous plants, said polymer being selected from the resins of the urea-formaldehyde type containing urea in a free condition, polyurethanes, polyvinyl alcohol which may be urethanized, potassium polystyrene sulphonate, maleic acid-vinyl acetate copolymers, polyvinyl acetate, polybutadiene, synthetic rubbers, natural rubber latex and asphaltic bitumen.

2. A process according to claim 1, in which the soil is initially treated with an iron salt, then with the polymer, in the presence of a protein substance.

3. A process according to claim 1, wherein an iron salt is used which is selected from ferrous sulphate, ferric sulphate, ferric chloride and mixtures thereof.

4. A process according to claim 1, wherein the polymer is a polyurethane.

5. A process according to claim 1, wherein a haemoglobin hydrolysate is used as the protein substance.

6. A process according to claim 1, wherein whey is used as the protein substance.

7. A process according to claim 1, wherein buttermilk is used as the protein substance.

8. A process according to claim 1, wherein a protein substance is used which is derived from soya.

9. A process according to claim 1, wherein the iron salt, the polymer or polymers and the protein substance are used in the form of aqueous solutions or dispersions which are sprayed over the surface of the soil or are incorporated into the topsoil.

10. A process according to claim 9, wherein an aqueous solution or dispersion containing from about 2 to 70% by weight urea-formaldehyde resin and about 0.1 to 15% by weight of free urea is sprayed over the soil.

11. A process according to claim 9, wherein an aqueous solution or dispersion containing from about 3 to 40% by weight of urea-formaldehyde resin and from 0.5 to 4% by weight of free urea is sprayed over the soil.

12. A process according to claim 9, wherein an aqueous solution or dispersion containing from about 3 to 8% by weight of urea-formaldehyde resin and from 0.1 to 0.5% by weight of free urea is incorporated into the topsoil, in a metered quantity, expressed in dry matter weight of the resin, of from about 0.2 to 2%, preferably about 1%, with respect to the weight of the soil.

13. A process according to claim 9, wherein a metered quantity of urea-formaldehyde resin is mixed with free urea, of from about 25 to 200 grams, preferably from about 70 to 100 grams of dry resin matter is sprayed over the soil per square meter of the surface of the soil to be treated.

14. A process according to claim 9, wherein a metered quantity of polyurethane of from about 30 to 50 grams of dry matter of this polymer is sprayed over the soil per square meter of the surface of the soil to be treated.

15. A process according to claim 1, wherein from about 10 to 80% by weight of ferrous sulphate and from about 1 to 20% by weight of protein substance are used, with respect to the dry matter weight of the polymer or polymers.

16. A process according to claim 1, wherein the soil is initially treated separately with a solution of an iron salt, then with a solution or dispersion of at least one said polymer and a protein substance.

17. A composition for conditioning loose or sandy soils, containing an iron salt, at least one polymer which does not require a pH greater than about 7 for it to harden, and a protein substance, said protein substance being of animal or vegetable origin, said protein of animal origin being selected from the group consisting of protein fractions of animal blood, milk and tissues, said vegetable protein being selected from the group consisting of protein fractions of cereals or leguminous plants, said polymer being selected from the resins of the urea-formaldehyde type containing urea in a free condition, polyurethanes, polyvinyl alcohol which may be urethanized, potassium polystyrene sulphonate, maleic acid-vinyl acetate copolymers, polyvinyl acetate, polybutadiene, synthetic rubbers, natural rubber latex and asphaltic bitumen.

18. A composition according to claim 17, wherein the iron salt is selected from ferrous sulphate, ferric sulphate, ferric chloride and mixtures thereof.

19. A composition according to claim 17, wherein the polymer is a polyurethane.

20. A composition according to claim 17, wherein the protein substance is a haemoglobin hydrolysate.

21. A composition according to claim 17, wherein the protein substance is whey.

22. A composition according to claim 17, wherein the protein substance is buttermilk.

23. A composition according to claim 17, wherein the protein substance is derived from soya.

24. A composition according to claim 17, wherein the iron salt, the polymer and the protein substance are dissolved or dispersed in water.

25. A composition according to claim 17, containing from about 10 to 80% by weight of ferrous sulphate and from about 1 to 20% by weight of protein substance, with respect to the dry matter weight of the polymer or polymers which are present.

* * * * *